US010871983B2

United States Patent
Feghali et al.

(10) Patent No.: US 10,871,983 B2
(45) Date of Patent: Dec. 22, 2020

(54) PROCESS-BASED MULTI-KEY TOTAL MEMORY ENCRYPTION

(71) Applicant: Intel Corporation, Santa Clara, CA (US)

(72) Inventors: Wajdi Feghali, Boston, MA (US); Vinodh Gopal, Westborough, MA (US); Kirk Yap, Westborough, MA (US); Sean Gulley, Sudbury, MA (US); Raghunandan Makaram, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 16/145,659

(22) Filed: Sep. 28, 2018

(65) Prior Publication Data

US 2019/0042481 A1    Feb. 7, 2019

Related U.S. Application Data

(60) Provisional application No. 62/678,783, filed on May 31, 2018.

(51) Int. Cl.
*G06F 9/455* (2018.01)
*G06F 12/14* (2006.01)
*H04L 9/08* (2006.01)

(52) U.S. Cl.
CPC ...... *G06F 9/45558* (2013.01); *G06F 12/1408* (2013.01); *G06F 12/1466* (2013.01);
(Continued)

(58) Field of Classification Search
CPC ........... G06F 12/1408; G06F 21/74–79; G06F 12/1009–1045; G06F 9/45558;
(Continued)

(56) References Cited

U.S. PATENT DOCUMENTS 9,418,220 B1 *   8/2016  McKee ................... G06F 21/53
2015/0248357 A1 *   9/2015  Kaplan ............... G06F 12/1408
                                                        713/193

(Continued)

OTHER PUBLICATIONS

Tomoaki Yamada et al., "Optimal Combinations of SCM Characteristics and Non-volatile Cache Algorithms for High-Performance SCM/NAND Flash Hybrid SSD", Jun. 2016, IEEE, 2016 IEEE Silicon Nanoelectronics Workshop (SNW), pp. 1-2 (Year: 2016).*

(Continued)

*Primary Examiner* — Reginald G Bragdon
*Assistant Examiner* — Curtis James Kortman
(74) *Attorney, Agent, or Firm* — Compass IP Law PC (57) ABSTRACT

Systems, methods, and circuitries are disclosed for a per-process memory encryption system. At least one translation lookaside buffer (TLB) is configured to encode key identifiers for keys in one or more bits of either the virtual memory address or the physical address. The process state memory configured to store a first process key table for a first process that maps key identifiers to unique keys and a second process key table that maps the key identifiers to different unique keys. The active process key table memory configured to store an active key table. In response to a request for data corresponding to a virtual memory address, the at least one TLB is configured to provide a key identifier for the data to the active process key table to cause the active process key table to return the unique key mapped to the key identifier.

21 Claims, 6 Drawing Sheets

(52) U.S. Cl.
CPC ........ G06F 12/1475 (2013.01); H04L 9/0894 (2013.01); *G06F 2009/45583* (2013.01); *G06F 2009/45587* (2013.01); *G06F 2212/1052* (2013.01); *G06F 2212/402* (2013.01)

(58) Field of Classification Search
CPC ....... G06F 12/1466–1475; G06F 21/70; G06F 2009/45583–45587
See application file for complete search history.

(56) References Cited

U.S. PATENT DOCUMENTS

2017/0132156 A1* 5/2017 Axnix ................. G06F 12/1408
2018/0095898 A1* 4/2018 Khosravi .............. G06F 21/445

OTHER PUBLICATIONS

Extended European Search Report dated Nov. 5, 2019 for European Patent Application No. EP19171960.8.
"Intel® Architecture Memory Encryption Technologies Specification," Ref. #336907-001US. Rev: 1.1. Dec. 2017.

* cited by examiner

PROCESS-BASED MULTI-KEY TOTAL MEMORY ENCRYPTION

CROSS REFERENCE TO RELATED APPLICATIONS

This application claims the benefit of priority to U.S. Provisional Patent Application No. 62/678,783, filed on May 31, 2018 which is hereby incorporated by reference in its entirety.

BACKGROUND

Current cryptographic virtual machine (VM) isolation architectures use multi-key total memory encryption (MKTME). Some cryptographic virtual machine (VM) isolation architectures may use upper bits of a system address space to identify keys, and 64-128 total keys may be used in the system, including all VMs.

DETAILED DESCRIPTION

Figure 1:
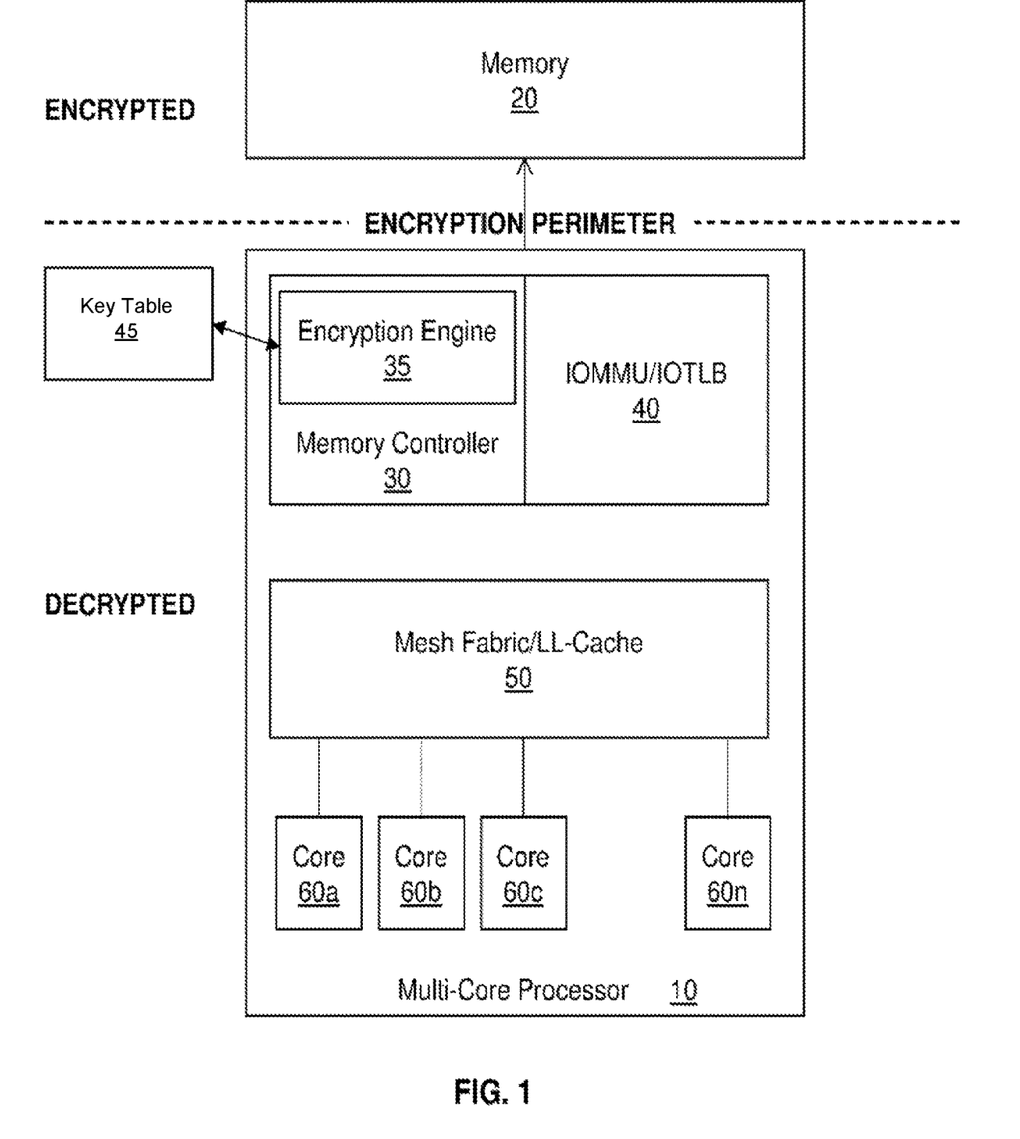
FIG. 1 illustrates a multi-key total memory encryption (MKTME) system in which encryption/decryption is performed as memory data enters or leaves a multi-core processor.

FIG. 1 illustrates an exemplary multi-core processor 10 (e.g., system-on-chip SoC) that supports multi-key total memory encryption (MKTME). The multi-core processor 10 is configured to access memory 20 as managed by a memory controller 30 and an input/output (IO) memory management unit (MMU)/IO with a translation lookaside buffer (TLB) 40. Multiple cores 60a-60n are configured to run multiple processes, threads, or virtual machines (VMs) in parallel and to transfer data and instructions between cores to/from the memory 20 through a mesh fabric and lower level (LL) cache 50. For the purposes of this description the term "process" is intended to encompass a process, a thread, a container, or a VM. To enable MKTME, the memory controller 30 includes an encryption engine 35 that is capable of encrypting data leaving the multi-core processor 10 and decrypting data entering the multi-core processor. This means that an "encryption perimeter" exists between the multi-core processor 10 and the memory 20 such that data within the perimeter is decrypted (e.g., plain text) while data outside the perimeter (e.g., on memory buses and in memory 20) is encrypted.

The encryption engine 35 is configured to access a key table 45 that maps key identifiers to encryption/decryption keys (herein after an encryption/decryption key will be referred to as simply a "key"). The encryption engine 35 encrypts data leaving the multi-core processor 10 using a key mapped to a key identifier that has been associated with the physical address in the IOTLB. The key identifier is encoded in one or more most significant bits (MSBs) of the physical address so that when the data is retrieved from memory, the key identifier for the key needed to decrypt the data can be determined from the physical address. The encoding of the key identifier in the physical address means that amount of memory that can be addressed using the physical address is reduced by the number of bits used to encode the key identifier.

The scaling of MKTME may be limited by the reduction in the total addressable memory size. For example, 128 key identifiers may result in a reduction of the maximum address size (e.g., from 52 bits to 45 bits). This could mean that a maximum addressable capacity of 32 Terabytes (TB) is shared between Memory-Mapped Configuration (MMCFG), Memory-Mapped Input/Output (MMIO), and regular memory usage. Current cryptographic virtual machine (VM) isolation architectures do not scale to such large numbers, and design trends are moving toward using more and more key identifiers. With core counts reaching 64 cores per socket, there may be 256 logical processors (hardware threads) in a 2S system and up to 1K logical processors in an 8S system. Further, emerging usages, such as FaaS (function as a service), may greatly increase the number of keys that would be active at a given time.

Described herein are systems, circuitries, and methods that move the encryption perimeter of an MKTME system to within each core of a multi-core processor. Each core has an encryption engine that encrypts data as it leaves the core and decrypts data when it is fetched into the core. The encryption perimeter may be located anywhere within the core, including at the interface between the Mid-Level Cache (MLC) and the shared Last Level Cache (LLC) (i.e., the "core-mesh-interface"), between the register files and the first level (L1) caches, or between the L1 caches and the MLC.

The location of the encryption perimeter may be selected based on a trade off between performance (which tends to move the perimeter outward) and security (which tends to move the perimeter inward). By moving encryption to the core level, each process may use its own key(s). Further, the keys may be encrypted with a system specific wrapping key and the wrapped key may be saved and restored as part of the process save/restore process (XSAVE).

The disclosed systems, circuitries, and methods may seamlessly scale to thousands of keys per multi-core processor, enabling isolation at a fine-grain level, such as containers, processes, and functions. More specifically, the disclosed systems, circuitries, and methods may scale naturally with number of cores and support very large number of keys—limited only by an ability of software to save/restore/manage the key handles. Multiple key-ids can be provided for a given process. For example, a process may use one key to protect its code, a second key to protect private data, a third key for its I/O with accelerators, and a fourth key for data shared with Operating System/Virtual Machine Monitor (OS/VMM). The need for encryption at the links (e.g., UPI, IAL, PCIE) may be eliminated and the Multi-Key Total Memory Encryption (MKTME) engine at the memory controller may be greatly simplified or even eliminated. The overhead of page-allocation and key-id swapping is also reduced as current architectures require a WBINVD (Write Back and Invalidate) of an entire cache hierarchy (or CLFLUSH (Cache Line Flush) the entire VM foot print). As such, the disclosed systems, circuitries, and methods may likely be used by CPU server vendors targeting cloud deployments.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "includes," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

Figure 2:
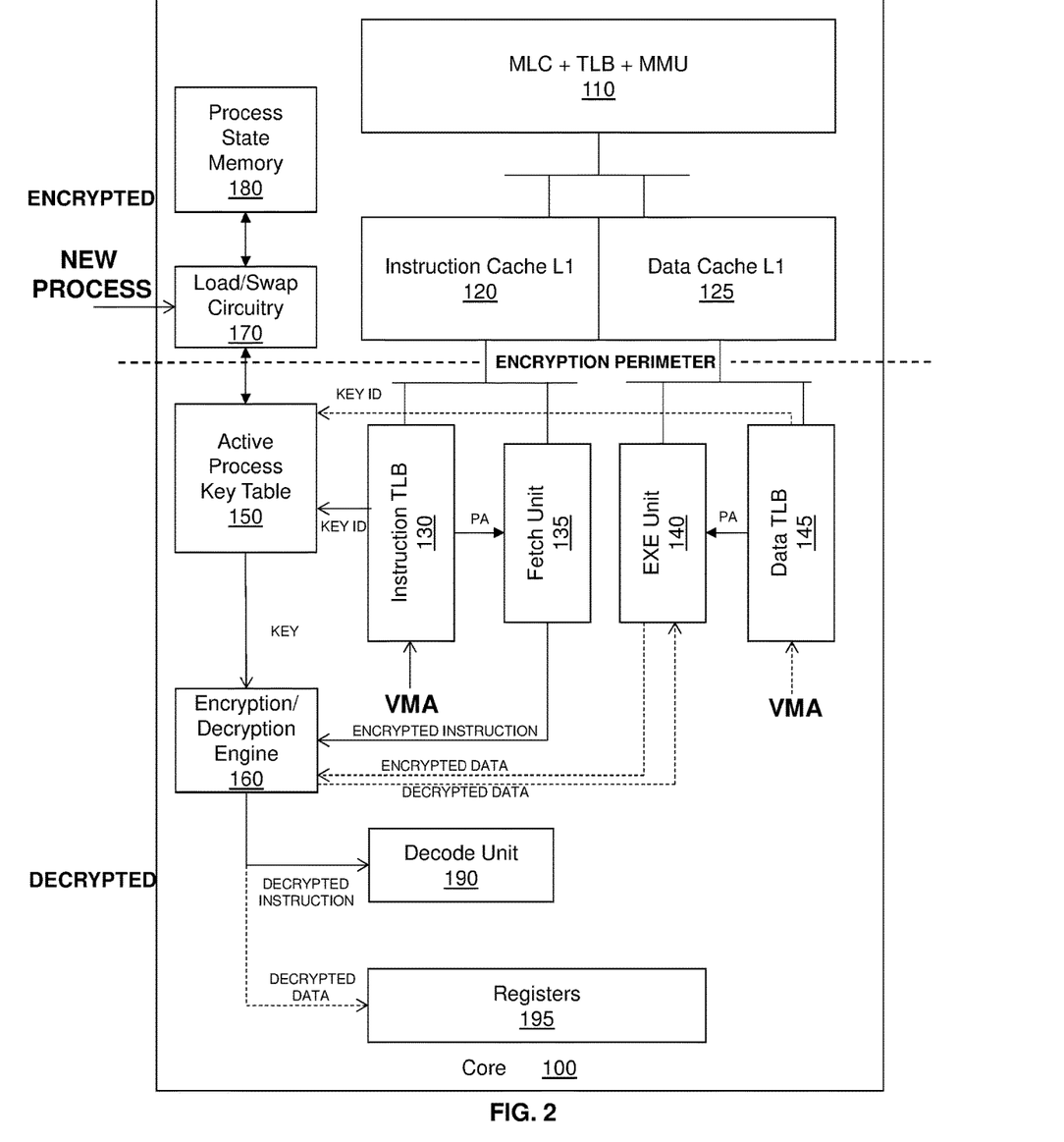
FIG. 2 illustrates an exemplary process-based MKTME in which encryption/decryption is performed on a per-process basis at a register-level boundary in a core of a multi-core processor in accordance with various aspects described.

FIG. 2 illustrates an exemplary core 100 of a multi-core processor (e.g., one of the cores 60a-60n of the multi-core processor 10 of FIG. 1) that encrypts/decrypts data on a per-process basis. The core 100 includes a mid level cache (MLC)/TLB/MMU 110 that interfaces with the mesh fabric/LL cache 50 of FIG. 1. The core 100 includes a first level (L1) instruction cache 120 and an L1data cache 125. The core 100 further includes an instruction TLB 130, a fetch unit 135, an execution (EXE) unit 140, and a data TLB 145. The fetch unit 135 fetches instructions from the instruction cache 120 (or L2 cache, LL cache 50 (FIG. 1), or memory 20 (FIG. 1) as necessary) and provides the instructions to a decode unit 190. The fetch unit 135 also stores data in registers 195 associated with the core 100. Likewise the EXE unit 140 retrieves data from the data cache 125 (or L2 cache, LL cache 50 (FIG. 1), or memory 20 (FIG. 1) as necessary) and stores the data in the registers 195.

The core 100 includes a per-process memory encryption system that includes memory 150 configured to store an active process key table, an encryption engine 160, load/swap circuitry 170, and memory 180 configured to store process state. The encryption engine 160 and/or load circuitry 170 may be functions performed by the operating system (OS) (e.g., code in execution by a processor). In the example illustrated in FIG. 2, the encryption perimeter is set between the L1 caches 120, 125 and the instruction TLB 130, the fetch unit 135, the execution (EXE) unit 140, and the data TLB 145. This means that data and instructions remain encrypted in the MLC 110 and L1 caches 120, 125 while data in the instruction TLB 130, the data TLB 145, and the registers 195 is decrypted. The decrypted data is processed by the fetch unit 135 and the execution unit 140. The use of an active process key table 150 means that unique keys are mapped to key identifiers on a per-process basis and thus the same set of key identifiers can be used by all processes in the core. For example key identifier 010 may be mapped to a first key in the process key table for process 1 and key identifier 010 may be mapped to a second key (different from the first key) in the process key table for process 2.

The load swap circuitry 170 loads the process key table for the process currently executing in the core 100 so that the correct key is used when the data is encrypted/decrypted for use by the process. When a new or different process begins execution in the core 100, the load/swap circuitry 170 stores the process key table for the process being swapped out in the process state memory 180. In one example, the load/swap circuitry 170 encrypts the register state with a wrapping key prior to the saving of all process states (including the registers) that is done by the core when switching processes. The load/swap circuitry 170 encrypts the process key table with the wrapping key and stores the process key table in the process state memory 180. The process state memory 180 may be included in an XSAVE architectural state. If the process key table does not change during the process lifetime, the load/swap circuitry 170 may store the encrypted process key table just once, in the first swap of the process key table.

The load/swap circuitry 170 then loads the process key table that was previously restored for the new process from the process state memory 180. Each key in a stored process key table that is loaded into the active process key table memory 150 from a saved state may be unwrapped by a core specific wrapping key. The page table for the OS may be enabled to have a new extended field to map which entries that contain a key identifier. The key identifier field may have a special encoding to denote that specific pages are not encrypted. As an example, this extended field may be a 2-bit field {no-encrypt, K1, K2, K3}.

If this is the initial startup of the new process, no process key table has yet been set up for the new process. In this case, the load/swap circuitry 170 populates a process key table for the new process in which unique encryption/decryption keys may be generated by the CPU core (e.g., random keys), obtained from other secure contexts, such as Software Guard Extensions (SGX), or provisioned by the VMM. The load/swap circuitry 170 may execute an instruction that causes the core 100 to load key(s). The operands may be the key identifier and what type of key is required (e.g., random, from SGX, etc.). The load key may be a privileged instruction.

The instruction TLB 230 and data TLB 245 include an extension that includes a key identifier that is used per page. When the TLB translates a virtual memory address (VMA) to a physical address for a page, the key identifier field is also read and sent to the EXE unit 240 or the fetch unit 235. Note that the key identifier may be encoded in either the VMA or the PA (referred to collectively as the "address") in the TLB. Encoding the key identifier in the VMA frees up all bits in the physical address for storing address bits, thereby maximizing the physical addressing capability for the physical memory. However, even if the TLB encodes the key identifier in the physical address since each process will use just a few keys, only a few bits of the physical address will be necessary to encode the key identifier, significantly increasing the number of physical memory addresses that may be addressed in an MKTME.

The EXE unit 240 or the fetch unit 235 launches an encryption/decryption engine 160 that accesses the active process key table 150 to determine a key associated with the key identifier. The encryption/decryption engine 160 uses the identified key to decrypt the data/instructions stored at the physical memory address. In this architecture, data in all core caches may be kept encrypted and may only be decrypted when loaded into the registers for processing or during instruction fetch/decode.

FIG. 2 illustrates an instruction fetch being performed by a core process. The VMA for the instruction is provided to the instruction TLB 130. The instruction TLB 130 returns the physical address (PA) for the instruction to the fetch unit 135 and also the key identifier for the instruction, which was encoded in the most significant bits of the address for the VMA in the instruction TLB 130. The fetch unit 135 retrieves and reads the instruction bytes stored in the PA in one of the core caches or memory. The core 100 loads up the encryption/decryption engine 160 with the key mapped to the key identifier in the active process key-table 150. The encryption/decryption engine 160 decrypts the instruction bytes and sends the decrypted instruction bytes to the decode unit 190.

For a load/store instruction a similar flow occurs as above except that data bytes, rather than instruction bytes are retrieved and decrypted and loaded into the registers 195 for loads. When data or instructions are moved from the registers 195 to core caches (e.g., instruction cache 120, data cache 125, or MLC 110) or memory, the encryption engine 160 loads up the keys mapped to key identifiers encoded in the virtual memory addresses or physical addresses for the data or instructions. The keys are used to encrypt data that is being moved from registers into the memory/caches. The TLB associated with the destination memory/cache encodes the key identifier in one or more bits of the virtual memory address or physical address for the data.

Figure 3:
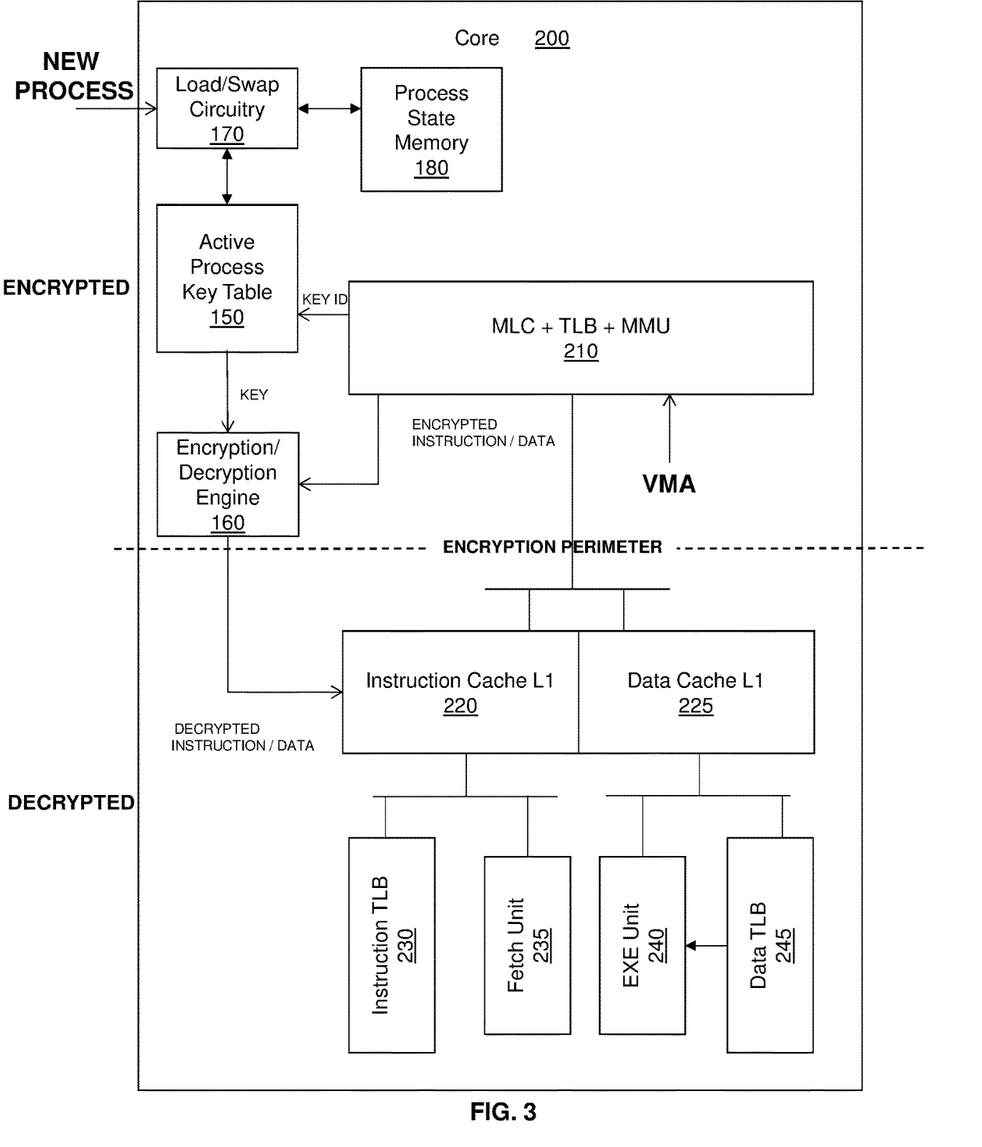
FIG. 3 illustrates an exemplary process-based MKTME in which encryption/decryption is performed on a per-process basis at boundary between a first level cache and a second level cache in a core of a multi-core processor in accordance with various aspects described.

FIG. 3 illustrates an exemplary core 200 in a multi-core processor in which the encryption perimeter is set between an MLC 210 and L1 caches 220, 225. This means that data and instructions remain encrypted in the MLC 210 while data in the L1 caches 220, 225 is decrypted. The TLB 210 associated with the MLC includes an extension that includes a key identifier that is used per page. When the TLB 210 translates a virtual memory address (VMA) to a physical address for a page, the key identifier field is also read. The core 200 launches the encryption/decryption engine 160 which accesses the active process key table 150 to determine a key associated with the key identifier. The encryption/decryption engine 160 uses the identified key to decrypt the data/instructions stored at the physical memory address. In this architecture, data in the MLC 210 may be kept encrypted and may only be decrypted when loaded into the L1 caches 220, 225 or registers (not shown).

When a VMA translation for data or an instruction is requested at the MLC 210, the VMA is provided to the instruction TLB 230. The TLB 210 returns the physical address (PA) for the data/instruction also the key identifier for the instruction, which was encoded in the most significant bits of the PA or the VMA in the TLB 210. The MMU retrieves and reads the instruction bytes stored in the PA in the MLC 210 or memory. The core 100 loads up the encryption/decryption engine 160 with the key mapped to the key identifier in the active process key-table 150. The encryption/decryption engine 160 decrypts the instruction/ data bytes and sends the decrypted bytes to L1 caches 220, 225. For returning data/instructions to the MLC 210 the encryption engine 160 loads up the keys mapped to key identifiers encoded in the physical addresses for the data/ instructions. The keys are used to encrypt instructions/data that are being moved from L1 caches 220, 225 into the MLC 210 or other memory outside the encryption perimeter.

If there is shared virtual memory between the CPU threads and I/O, a mechanism for accessing the data may include one or more of the following approaches. In one approach, one or more Storage Virtual Machine (SVM) I/O devices (e.g., IOMMU/IOTLB 40 of FIG. 1) have an encryption/decryption engine. The IOMMU/IOTLB 40 maintains copies of the process key tables for the processes that are executing in the core. Then the IOTLB translation requests also return the key identifier bits. The IOMMU/IOTLB 40 identifies the process that stored to data based on the process that is associated with the physical address space. The IOMMU/IOTLB 40 can then determine the key from the process key table for the identified process and decrypt/encrypt the data as necessary. In this manner the system may ensure that the same key will be used to decrypt data inside the IOMMU/IOTLB 40 as was used by the core 200 to encrypt the data and vice versa. In another approach, the IOMMU/IOTLB 40 may not be expected to have the ability to manipulate encrypted data. In this approach, data buffers that CPU threads share with the IOMMU/IOTLB 40 may be in pages marked as decrypted.

Figure 4:
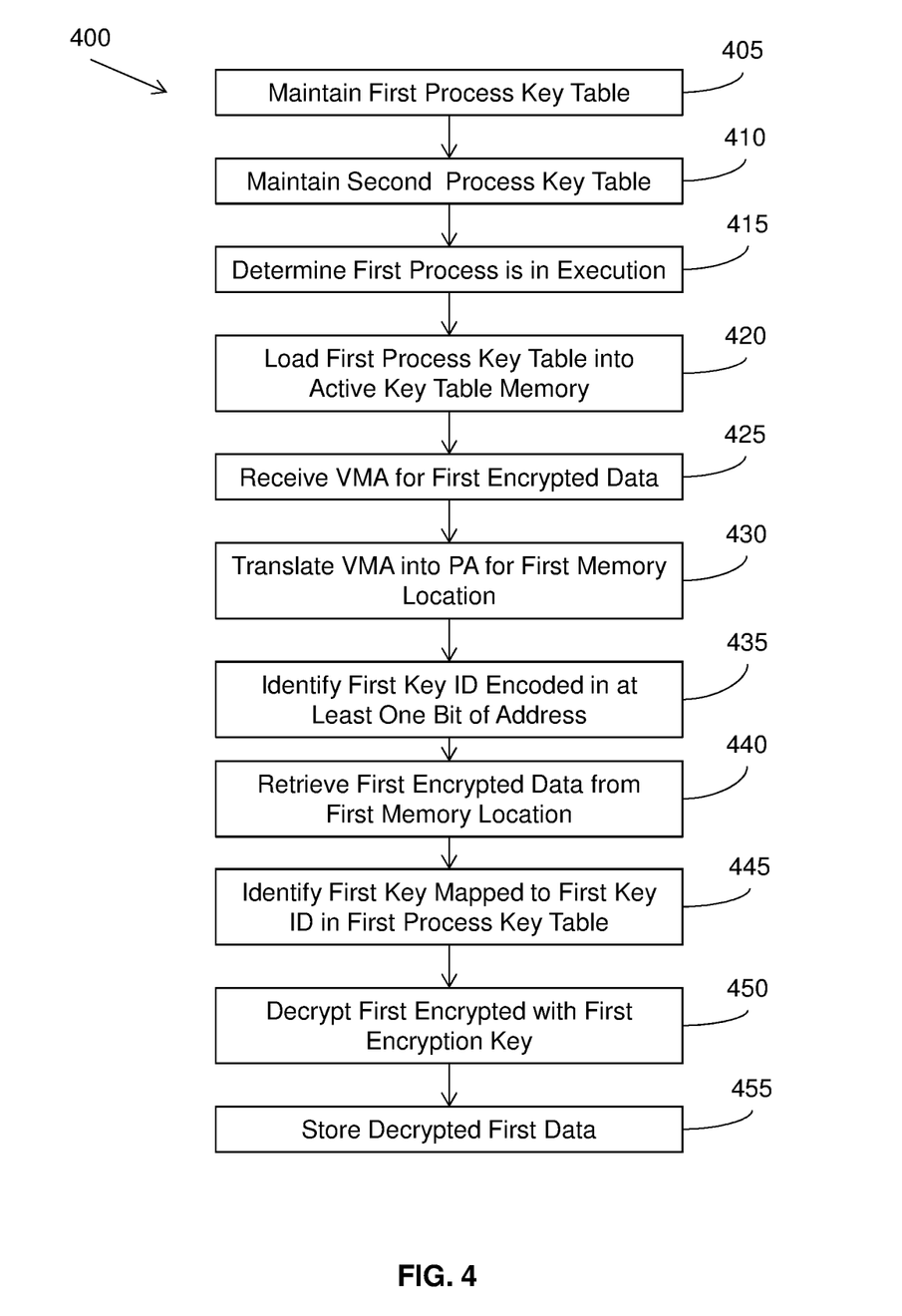
FIG. 4 illustrates a flow diagram of an exemplary method of encrypting data in accordance with various aspects described.

FIG. 4 illustrates an example method 400 configured to decrypt data with a core in a multi-core processor. The method 400 may be performed by the core 100 of FIG. 2 and/or the core 200 of FIG. 3. The method includes, at 405, maintaining a first process key table for a first process, wherein the first process key table maps unique keys to a set of key identifiers. The method includes, at 410, maintaining a second process key table for a second process, wherein the second process key table maps unique keys to the set of key identifiers. The method includes, at 415, determining that the first process is in execution by the processor core. The method includes, at 420, loading the first process key table into active process key table memory. The method includes, at 425, receiving a first virtual memory address for first data. The method includes, at 430, translating the first virtual memory address into a first physical memory address that identifies a first memory location. The method includes, at 435, identifying a first key identifier of the set of key identifiers encoded in at least one bit of the first physical memory address. The method includes, at 440, retrieving first encrypted data from the first memory location. The method includes, at 445, identifying a first key mapped to the first key identifier in the first process key table. The method includes, at 450, decrypting the first encrypted data using the first key to generate decrypted first data. The method includes, at 455, storing the decrypted first data for access by the first process.

While the above description has been in the context of encryption/decryption at the core level on a per-process basis, the described methods and circuitries may also be applied on a per hardware thread basis in cores that support multi-threading. A hardware thread is a dedicated set of registers execution units that are reserved for storing the state of a given process. In such an application, each hardware thread has a key table. It is possible for hardware threads to share caches (L1, MLC, and TLBs). If the data is kept unencrypted in the cache, then the data should be tagged with both a key identifier and hardware thread identifier.

Examples and embodiments, described herein, may include multiple types of subject matter, such as one or more methods, means for performing acts, operations, or blocks of the method, one or more machine-readable mediums including instructions that, when performed by a machine (e.g., a processor) cause the machine to perform acts, operations, or blocks of the method, and one or more systems or apparatuses configured (e.g., with one or more characteristics, features, components, etc.) to perform acts, operations, or blocks of the method, which may include using one or more communication standards or technologies.

Figure 5:
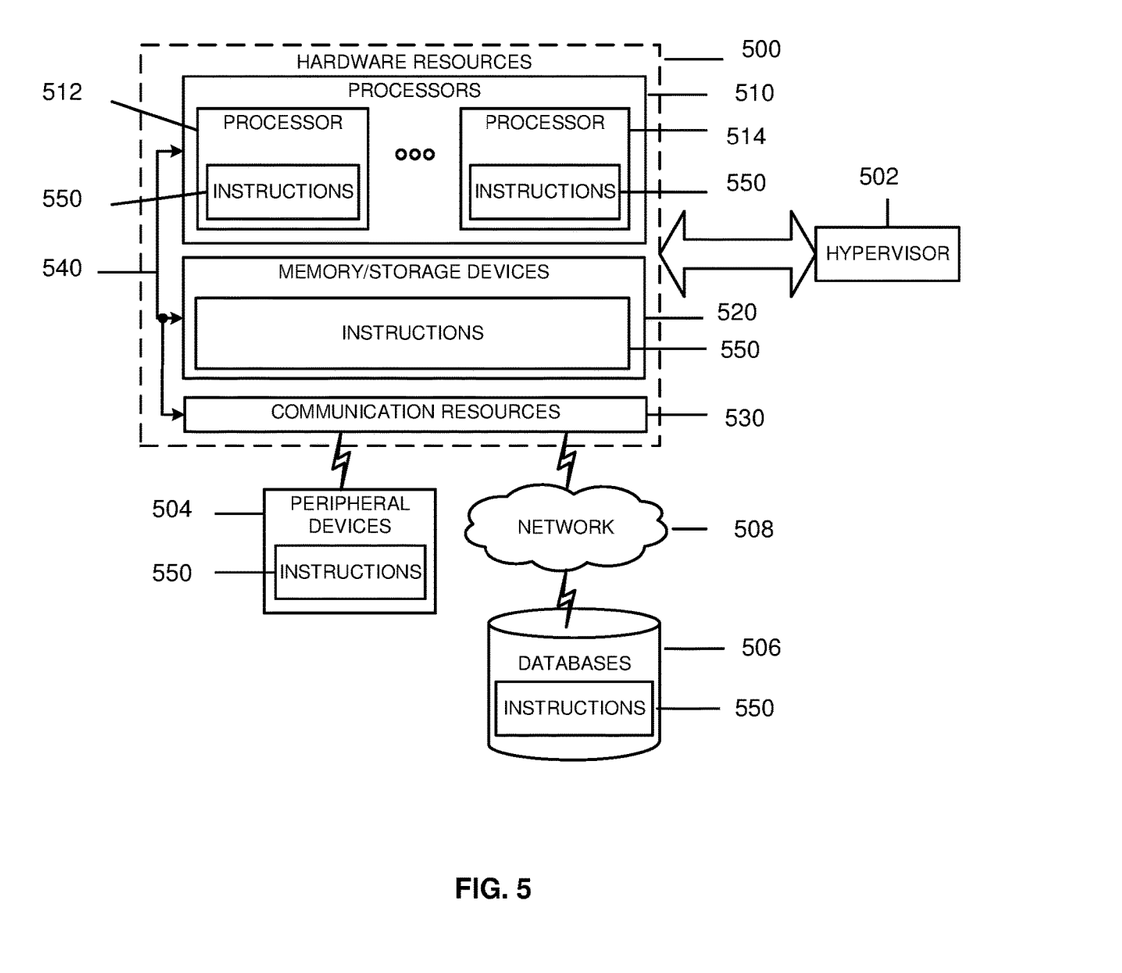
FIG. 5 is a block diagram illustrating components able to read instructions from a machine-readable medium and perform any one or more of the methodologies discussed herein.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

In embodiments, described herein, the device of FIG. 5 (e.g., processors 510, 512, and/or 514) and/or one or more other components thereof, may: maintain a repository of information associating a plurality of keys with a plurality of core-specific processes; decrypt incoming information, based on the incoming information and a key, of the plurality of keys, being associated with a particular process of the plurality of core-specific processes; and encrypt outgoing information, based on the outgoing information and the key being associated with the particular process of the plurality of core-specific processes.

Figure 6:
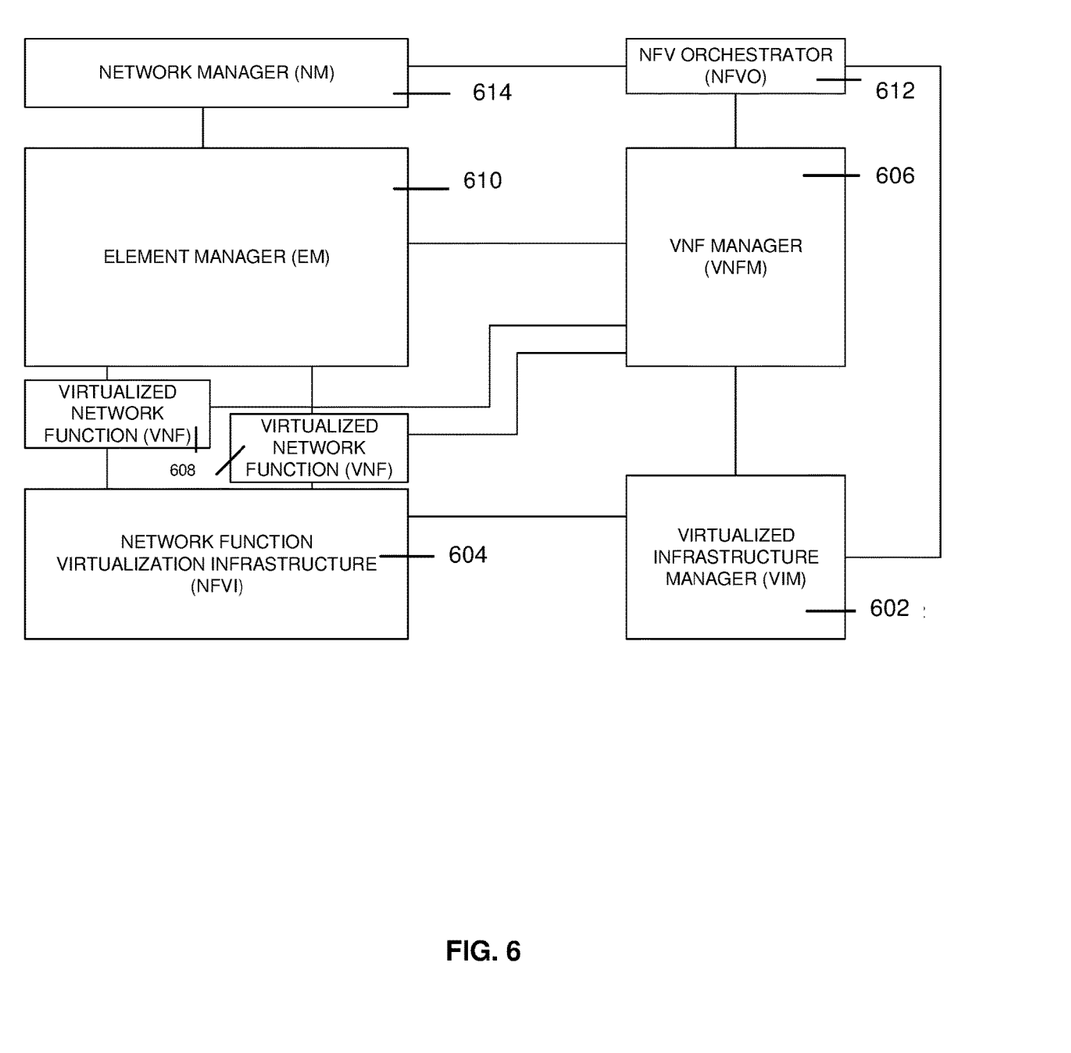
FIG. 6 is a block diagram illustrating components of a system to support node virtualization (NFV).

FIG. 6 is a block diagram illustrating components, according to some example embodiments, of a system 600 to support NFV. The system 600 is illustrated as including a virtualized infrastructure manager (VIM) 602, a network function virtualization infrastructure (NFVI) 604, a VNF manager (VNFM) 606, virtualized network functions (VNFs) 608, an element manager (EM) 610, an NFV Orchestrator (NFVO) 612, and a network manager (NM) 614. In some examples, one or more of the components of system 602 may be created, configured, deployed, monitored, and/or managed by one or more of the components of FIG. 5.

The VIM 602 manages the resources of the NFVI 604. The NFVI 604 can include physical or virtual resources and applications (including hypervisors) used to execute the system 600. The VIM 602 may manage the life cycle of virtual resources with the NFVI 604 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 606 may manage the VNFs 608. The VNFs 608 may be used to execute EPC components/functions. The VNFM 606 may manage the life cycle of the VNFs 608 and track performance, fault and security of the virtual aspects of VNFs 608. The EM 610 may track the performance, fault and security of the functional aspects of VNFs 608. The tracking data from the VNFM 606 and the EM 610 may comprise, for example, performance measurement (PM) data used by the VIM 602 or the NFVI 604. Both the VNFM 606 and the EM 610 can scale up/down the quantity of VNFs of the system 600.

The NFVO 612 may coordinate, authorize, release and engage resources of the NFVI 604 in order to provide the requested service (e.g., to execute an EPC function, component, or slice). The NM 614 may provide a package of end-user functions with the responsibility for the management of a network, which may include network elements with VNFs, non-virtualized network functions, or both (management of the VNFs may occur via the EM 610).

In some embodiments, the electronic device(s), network(s), system(s), chip(s) or component(s), or portions or implementations thereof, of the figures presented above may be configured to perform one or more processes, techniques, or methods as described herein, or portions thereof. One such process is depicted in FIG. 6. For example, the process may include generate, load, and/or maintain information associating core processes with keys, decrypting incoming information using a particular key, based on the incoming information and they key being associated with the same core process, and encrypting outgoing information using a particular key, based on the outgoing information and the key being associated with the same core process.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for encrypting/decrypting data on a per-process basis in a processor core according to embodiments and examples described herein.

Example 1 is a method for decrypting data including: maintaining a first process key table for a first process, wherein the first process key table maps unique keys to a set of key identifiers; maintaining a second process key table for a second process, wherein the second process key table maps unique keys to the set of key identifiers; determining that the first process is in execution by the processor core; loading the first process key table into active process key table memory; receiving a first virtual memory address for first data; translating the first virtual memory address into a first physical memory address that identifies a first memory location; identifying a first key identifier of the set of key identifiers encoded in at least one bit of the first physical memory address or virtual memory address; retrieving first encrypted data from the first memory location; identifying a first key mapped to the first key identifier in the first process key table; decrypting the first encrypted data using the first key to generate decrypted first data; and storing the decrypted first data for access by the first process.

Example 2 includes the subject matter of example 1, including or omitting optional elements, further including retrieving the first encrypted data from a first level cache associated with the core and storing the decrypted first data in a register associated with the core.

Example 3 includes the subject matter of example 1, including or omitting optional elements, further including retrieving the first encrypted data from a mid level cache associated with the core and storing the decrypted first data in a first level cache associated with the core.

Example 4 includes the subject matter of example 1, including or omitting optional elements, further including determining that the second process is in execution by the core; storing the first process key table in first process state memory; loading the second process key table into the active process key table memory; receiving a second virtual memory address for second data; translating the second virtual memory address into a second physical memory address that identifies a second memory location; identifying the first key identifier of the set of key identifiers encoded in the at least one bit of the second physical memory address or the second virtual memory address; retrieving second encrypted data from the second memory location; identifying a second key mapped to the first key identifier in the second process key table; decrypting the second data using the second key to generate decrypted second data; and storing the decrypted second data for access by the second process.

Example 5 includes the subject matter of example 1, including or omitting optional elements, further including encrypting the first process key table prior to storing the first process key table in the first process state memory.

Example 6 includes the subject matter of example 1, including or omitting optional elements, further including with an I/O circuit for the core: maintaining a copy of the first process key table and the second process key table; receiving, from a third process, a request for third data stored at a third physical memory address identifying a third memory location associated with the first process; identifying key identifier encoded in a bit of the third physical memory address; identifying a key mapped to the key identifier in the copy of the first process key table; retrieving third encrypted data from the third memory location; decrypting the third encrypted data with the key to generate decrypted third data; and storing the decrypted third data for access by the third process.

Example 7 is a per-process memory encryption system, including, in each core of a multi-core processor, at least one translation lookaside buffer (TLB), process state memory, and active process key table memory. The TLB is configured to map virtual memory addresses to physical addresses and encode key identifiers for keys in one or more bits of either the virtual memory address or the physical address in the TLB. The process state memory configured to store a first process key table for a first process that maps key identifiers to unique keys and a second process key table that maps the key identifiers to different unique keys. The active process key table memory configured to store an active key table corresponding to the first process key table when the first process is active and the second process key table when the second process is active. In response to a request for data corresponding to a virtual memory address, the at least one TLB is configured to provide a key identifier encoded in the virtual memory address or physical address in the TLB for the data to the active process key table to cause the active process key table to return the unique key mapped to the key identifier.

Example 8 includes the subject matter of example 7, including or omitting optional elements, further including load/swap circuitry configured to, when the first process is active, identify that the second process is being loaded for execution; in response, store the first process key table in the process state memory; and store the second process key table in the active process key table memory.

Example 9 includes the subject matter of example 8, including or omitting optional elements, wherein the load/swap circuitry is configured to encrypt the first process key table prior to storing the first process key table in process state memory.

Example 10 includes the subject matter of example 9, including or omitting optional elements, wherein the load/swap circuitry is configured to generate a third process key table for a new third process.

Example 11 includes the subject matter of example 10, including or omitting optional elements, wherein the load/swap circuitry is configured to generate random keys for the third process key table.

Example 12 includes the subject matter of example 10, including or omitting optional elements, wherein the load/swap circuitry is configured to obtain keys for the third process key table from a secure context.

Example 13 includes the subject matter of example 10, including or omitting optional elements, wherein the load/swap circuitry is configured to obtain keys for the third process key table from a virtual machine manager.

Example 14 includes the subject matter of example 8, including or omitting optional elements, wherein the TLB is associated with an execution unit.

Example 15 includes the subject matter of example 7, including or omitting optional elements, wherein the TLB is associated with a first level cache of the core.

Example 16 is a per-process memory encryption system, including, in each hardware thread of a core, at least one translation lookaside buffer (TLB), process state memory, and active process key table memory. The TLB is configured to map virtual memory addresses to physical addresses and configured to encode key identifiers for keys in one or more bits of either the virtual memory address or the physical address in the TLB. The process state memory is configured to store a first process key table for a first process that maps key identifiers to unique keys and a second process key table that maps the key identifiers to different unique keys. The active process key table memory is configured to store an active key table corresponding to the first process key table when the first process is active and the second process key table when the second process is active. In response to a request for data corresponding to a virtual memory address, the at least one TLB is configured to provide a key identifier encoded in the virtual memory address or physical address in the TLB for the data to the active process key table to cause the active process key table to return the unique key mapped to the key identifier.

Example 17 includes the subject matter of example 16, including or omitting optional elements, further including load/swap circuitry configured to, when the first process is active, identify that the second process is being loaded for execution; in response, store the first process key table in the process state memory; and store the second process key table in the active process key table memory.

Example 18 includes the subject matter of example 16, including or omitting optional elements, wherein the load/swap circuitry is configured to encrypt the first process key table prior to storing the first process key table in process state memory.

Example 19 includes the subject matter of example 16, including or omitting optional elements, wherein data in a cache shared by multiple hardware threads is tagged with a key identifier and a hardware-thread identifier.

Example 20 includes the subject matter of example 16, including or omitting optional elements, wherein the TLB is associated with an execution unit.

Example 21 includes the subject matter of example 16, including or omitting optional elements, wherein the TLB is associated with a first level cache of the core.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

The invention claimed is:

1. A method for decrypting data including:
    maintaining a first process key table for a first process, wherein the first process key table maps keys for the first process to a set of key identifiers;
    maintaining a second process key table for a second process, wherein the second process key table maps different keys for the second process to the set of key identifiers;
    determining that the first process is in execution by a processor core;
    in response to determining that the first process is in execution by the processor core:
        loading the first process key table into an active process key table memory;
        receiving a first virtual memory address for first data;
        translating the first virtual memory address into a first physical memory address that identifies a first memory location;
        identifying a first key identifier of the set of key identifiers, the first key identifier encoded in at least one bit of the first physical memory address or the first virtual memory address;
        retrieving first encrypted data from the first memory location;
        identifying a first key for the first process mapped to the first key identifier in the active process key table memory;
        decrypting the first encrypted data using the first key to generate decrypted first data;
        storing the decrypted first data for access by the first process; and
    in response to determining that the second process is in execution by a processor core: loading the second process key table into the active process key table memory.

2. The method of claim 1, further including:
    retrieving the first encrypted data from a first level cache associated with the processor core; and
    storing the decrypted first data in a register associated with the core.

3. The method of claim 1, further including:
    retrieving the first encrypted data from a mid level cache associated with the processor core; and
    storing the decrypted first data in a first level cache associated with the processor core.

4. The method of claim 1, further including:
    in response to determining that the second process is in execution by a processor core:
        storing the first process key table in a first process state memory;
        receiving a second virtual memory address for second data;
        translating the second virtual memory address into a second physical memory address that identifies a second memory location;
        identifying the first key identifier of the set of key identifiers encoded in at least one bit of the second physical memory address or the second virtual memory address;
        retrieving second encrypted data from the second memory location;
        identifying a second key for the second process mapped to the first key identifier in the active process key table memory;
        decrypting the second data using the second key to generate decrypted second data; and
        storing the decrypted second data for access by the second process.

5. The method of claim 4, further including encrypting the first process key table prior to storing the first process key table in the first process state memory.

6. The method of claim 1, further including with an I/O circuit for the processor core:
    maintaining a copy of the first process key table and the second process key table;
    receiving, from a third process, a request for third data stored at a third physical memory address identifying a third memory location associated with the first process;
    identifying a key identifier encoded in a bit of the third physical memory address;
    identifying a key mapped to the key identifier in the copy of the first process key table;
    retrieving third encrypted data from the third memory location;
    decrypting the third encrypted data with the key to generate decrypted third data; and
    storing the decrypted third data for access by the third process.

7. A per-process memory encryption system, including, in each core of a multi-core processor:
    at least one translation lookaside buffer (TLB) configured to map virtual memory addresses to physical addresses, wherein the TLB is configured to encode key identifiers for keys in one or more bits of either a virtual memory address or a physical address in the TLB;
    process state memory configured to store a first process key table for a first process that maps key identifiers to unique keys and a second process key table for a second process that maps the key identifiers to different unique keys; and active process key table memory configured to store an active key table corresponding to the first process key table when the first process is active and the second process key table when the second process is active;

wherein in response to a request for data corresponding to a virtual memory address, the at least one TLB is configured to provide a key identifier encoded in the virtual memory address or physical address in the TLB for the data to the active process key table memory to cause the active process key table memory to return the unique key mapped to the key identifier.

8. The per-process memory encryption system of claim 7, further including:
load/swap circuitry configured to, when the first process is active:
identify that the second process is being loaded for execution;
in response, store the first process key table in the process state memory; and
store the second process key table in the active process key table memory.

9. The per-process memory encryption system of claim 8, wherein the load/swap circuitry is configured to encrypt the first process key table prior to storage of the first process key table in process state memory.

10. The per-process memory encryption system of claim 9, wherein the load/swap circuitry is configured to generate a third process key table for a new third process.

11. The per-process memory encryption system of claim 10, wherein the load/swap circuitry is configured to generate random keys for the third process key table.

12. The per-process memory encryption system of claim 10, wherein the load/swap circuitry is configured to obtain keys for the third process key table from a secure context.

13. The per-process memory encryption system of claim 10, wherein the load/swap circuitry is configured to obtain keys for the third process key table from a virtual machine manager.

14. The per-process memory encryption system of claim 8, wherein the TLB is associated with an execution unit.

15. The per-process memory encryption system of claim 8, wherein the TLB is associated with a first level cache of the core.

16. A per-process memory encryption system, including, in each hardware thread of a core:
at least one translation lookaside buffer (TLB) configured to map virtual memory addresses to physical addresses, wherein the TLB is configured to encode key identifiers for keys in one or more bits of either a virtual memory address or a physical address in the TLB;
process state memory configured to store a first process key table for a first process that maps key identifiers to unique keys and a second process key table for a second process that maps the key identifiers to different unique keys; and
active process key table memory configured to store an active key table corresponding to the first process key table when the first process is active and the second process key table when the second process is active;
wherein in response to a request for data corresponding to a virtual memory address, the at least one TLB is configured to provide a key identifier encoded in the virtual memory address or physical address in the TLB for the data to the active process key table memory to cause the active process key table memory to return the unique key mapped to the key identifier.

17. The per-process memory encryption system of claim 16, further including:
load/swap circuitry configured to, when the first process is active:
identify that the second process is being loaded for execution;
in response, store the first process key table in the process state memory; and
store the second process key table in the active process key table memory.

18. The per-process memory encryption system of claim 17, wherein the load/swap circuitry is configured to encrypt the first process key table prior to storage of the first process key table in process state memory.

19. The per-process memory encryption system of claim 16, wherein data in a cache shared by multiple hardware threads is tagged with a key identifier and a hardware-thread identifier.

20. The per-process memory encryption system of claim 16, wherein the TLB is associated with an execution unit.

21. The per-process memory encryption system of claim 16, wherein the TLB is associated with a first level cache of the core.

* * * * *